United States Patent
Kraus

(10) Patent No.: US 9,302,758 B2
(45) Date of Patent: Apr. 5, 2016

(54) SUPER-RIGID HYBRID AIRSHIP, ITS STRUCTURAL CHARACTERISTICS AND A METHOD OF PRODUCING THEREOF

(76) Inventor: Hans Georg Kraus, Sao Paulo (BR)

( * ) Notice: Subject to any disclaimer, the term of this patent is extended or adjusted under 35 U.S.C. 154(b) by 331 days.

(21) Appl. No.: 13/812,495

(22) PCT Filed: Jun. 3, 2011

(86) PCT No.: PCT/IB2011/001216
§ 371 (c)(1),
(2), (4) Date: Jan. 26, 2013

(87) PCT Pub. No.: WO2011/154797
PCT Pub. Date: Dec. 15, 2011

(65) Prior Publication Data
US 2013/0277496 A1    Oct. 24, 2013

(30) Foreign Application Priority Data
Jun. 7, 2010  (BR) .............. PI1001654-6

(51) Int. Cl.
| | | |
|---|---|---|
| B64C 1/08 | (2006.01) |
| B64B 1/08 | (2006.01) |
| B64B 1/00 | (2006.01) |
| B64B 1/16 | (2006.01) |
| B64B 1/20 | (2006.01) |
| B64B 1/22 | (2006.01) |
| B64B 1/30 | (2006.01) |
| B64B 1/60 | (2006.01) |
| B64B 1/66 | (2006.01) |
| B64F 1/14 | (2006.01) |
| B64F 5/00 | (2006.01) |

(52) U.S. Cl.
CPC ... *B64B 1/08* (2013.01); *B64B 1/00* (2013.01); *B64B 1/16* (2013.01); *B64B 1/20* (2013.01); *B64B 1/22* (2013.01); *B64B 1/30* (2013.01); *B64B 1/60* (2013.01); *B64B 1/66* (2013.01); *B64F 1/14* (2013.01); *B64F 5/0009* (2013.01); *Y02T 50/82* (2013.01)

(58) Field of Classification Search
CPC .............. B64B 1/06; B64B 1/08; B64B 1/10; B64B 1/16; B64B 1/30; B64B 1/58; B64B 1/60
USPC ............. 244/24, 25, 29, 30, 96, 97, 125, 126, 244/128
See application file for complete search history.

(56) References Cited

U.S. PATENT DOCUMENTS

| | | | | |
|---|---|---|---|---|
| 1,641,323 | A * | 9/1927 | Humy ......................... 244/125 |
| 4,489,123 | A * | 12/1984 | Schijve et al. ................ 428/213 |
| 5,358,200 | A * | 10/1994 | Onda ............................. 244/96 |
| 2010/0102164 | A1* | 4/2010 | Brutoco .......................... 244/30 |

FOREIGN PATENT DOCUMENTS

EP       1400444 A2 *  3/2004

* cited by examiner

*Primary Examiner* — Nicholas McFall
(74) *Attorney, Agent, or Firm* — John Alumit

(57) ABSTRACT

A super-rigid hybrid airship having a modular structure with a central tube having a diameter of between 5 to 10% of the diameter of the airship, structural rings surrounding and preferably concentric with the central tube and connected to the tube by bolts; an external cover made from thin metal sheets, interspersed with composite resins and fibbers which is pressurized and pre-stressed by light gases and which is rigid, conductive, non-combustible and impermeable to gases; balloons filed with hydrogen and disposed in structural sections defined by neighboring structural rings; at least two interconnected cuffs inflated by atmospheric air serving as operational ballast and ensuring weight, pressure and volume balance of the airship. Preferably the airship has a blower system for dispersing air, arranged on the centerline of the top layer, wings arranged at each side of the fixed sections, and thrust means.

11 Claims, 10 Drawing Sheets

20   16

21

SUPER-RIGID HYBRID AIRSHIP, ITS STRUCTURAL CHARACTERISTICS AND A METHOD OF PRODUCING THEREOF

CROSS-REFERENCE TO RELATED APPLICATION

This present application claims the benefit of WIPO application no. WO 2011/154797 A2 filed on Jun. 3, 2011, and published on Dec. 15, 2011 as PCT/IB2011/001216. The earliest priority date claimed is Jun. 7, 2010.

FEDERALLY SPONSORED RESEARCH

Not Applicable

SEQUENCE LISTING OR PROGRAM

Not Applicable

BACKGROUND

The invention relates to a hybrid airship of a dirigible type, structural characteristic and a method of construction thereof. The invention is applicable in the aeronautical market, environmental enterprises, construction work, transport, hoisting and various other applications.

Currently the following categories of aerostats are known:

Rigid Aerostats.

In aircrafts of this type a truss frame structure is used, built with caves and stringers that define the format of the aircraft that is then coated with light materials such as impregnated fabric, rubber and materials that give the aircraft its final form. An aircraft of this type does not have any internal pressurization because the gas is stored in some balloons disposed internally within the structure and the entire mechanic load of the engines, cabins, rudders and other aircraft components is fixed to this structure.

Rigid aerostats are so far the safest and the fastest, and have bigger useful load capability than other aerostat types. Exemplary rigid aerostats were Graf the Zeppelin and the Hindenburg.

Semi-Rigid Aerostats.

These aircrafts use internal overpressure to maintain the shape of the aircraft, but utilize structural elements in key points to support the cabin, engines, rudders and other heavier items. They are usually covered with flexible and resistant materials (such as Hypalon®), like those used in rubber boats.

Non-Rigid Aerostats.

These aircrafts are covered with flexible material, pressurized generally with Helium, and its cabin is hanging. They are also known as Blimps (an example is the promotional Goodyear airship).

Metal-Clad.

These airships share some characteristics of rigid and non-rigid ones, using a very thin and hermetic metal balloon instead of a Hypalon or conventional rubber one. There are only two examples of this kind of airship, the aluminium balloon of Schwarz from 1897 and the ZMC-2.

Some lighter air airships, known as dirigible airships had limited resources and technology during the first decades of the past century (i.e. when they dominated the air). While the resources and technology are available today, development of dirigibles is still limited as it has been in the past, which in turn limits their production and utilization. Difficulties arise like security, dimensional stability in bad weather conditions (i.e. turbulences and hurricanes), resistance to thunderbolts, fire-resistance (ability not to take fire), controllability in adverse conditions, buoyancy in heavy rain conditions, instability when flying at higher velocities (more than 150 km/h), and other construction limitations with regard to the size of such aircrafts.

In addition to increased security considerations, production costs, and fear over another Hindenburg-like accident (the biggest dirigible that operated in the third decade of the last century), these limitations have deterred the development of such aircrafts. Engineering advancement in dirigible airships has evolved to focus on a semi-rigid structure. Utilizing hi-tech materials, such as carbon fiber and hardened aluminum as structural elements, and special high strength plastic and rubber sheets, such as Hypalon, provides better dimensional and operational stability.

Nonetheless modern semi-rigid dirigibles still have the same deficiencies as the old dirigibles, as follows: operational and structural instability in adverse conditions during bad weather, storms, and atmospheric gusts; sensitivity to rapid fluctuation of temperature and atmospheric pressure; difficulty to retain buoyancy in torrential rain conditions; complications and difficulties in securely executing proper techniques during landing and take-off; speed limitation of about 150 km/h; limitations in manufacturing technology to provide cost-viable model for larger size aircraft; high hydrogen and/or helium permeability coefficient that limits aircraft material from retaining gas efficiently; restrictions on hydrogen use due to high risk of combustion overshadowing its very desirable low-density property for aerostat flight and low production cost; radiation and electric discharge risk; difficulties in maintaining stable flying condition in fluctuating air density at various altitudes; weight of the ballast (used to adjust aircraft density to compensate for any fluctuation) greatly reduces fuel efficiency; economy of scale difficulties to support the construction of large hangers required in manufacturing large airships; large surface area and high drag coefficient generate poor aerodynamic airflow that greatly limits speed and fuel efficiency; and difficulty in maintaining stable airship position during landing and when stationary. The present invention proposed can reduce these limitations.

SUMMARY

The invention creates a new category of hybrid airships, an auto-sustainable rigid airship, as defined in claims 1 to 11.

The airship has an egg or cigar shaped form and coated externally with a thin metallic plates with intercalated composite material consisting of resin and strong fibers like Kevlar, carbon and glass fibers, and internal inserts are pressurized between 0.01 to 0.14 kg/cm2 (~100 to 1400 mmCA), thus providing all the advantages a rigid structure, but through use of internal light gas pressure.

Such a material is rigid, incombustible and impermeable to gases and prevents leakage, while an internal atmosphere free from oxygen prevents ignition of fire. Because the structure is completely conductive by use of thin metal blades outside of the airship's body, the structure does not create conditions for generating or storing static energy. The structure is also resistant to thunderbolts, thunderstorm and UV rays.

A super-rigid internal structure is based on a spine-like pressurized tubular structure with an approximate diameter between 5 to 10% of the maximum diameter of the aircraft, and disposed preferably along the central line from nose to tail. The tube is preferably pressurized with hydrogen having internal pressures of between 0.5 to 2.0 kg/cm2, which keeps it straight and rigid. Furthermore, hydrogen action applied to the domes (cupules) on the nose and tail at the rear may extend the airship and equally distribute the ducted fan or turbine's mechanical reaction forces through the entire body and nose.

The external cover, produced preferably from rigid composite material that begins at the dome and ends at the tail, is strongly secured to the pressurized toroidal (tire-like) forms (Brazilian application No. PI0706251-6). In the case of a cigar-shaped airship, the external cover is settled in an approximate space of between 50% to 100% of the maximum diameter, having centers connected concentrically to the central tube, preferably with a series of straight, pulled cables, of a configuration similar to that of bicycle wheels. Such an internal structure is able to keep the airship's shape, even if it loses its internal pressure during flight.

These structures, added to another shell made of very strong and rigid composite material, are also very strong due to internal overpressure, thereby strengthening the shape of this new category of super rigid airships.

Maintenance of internal chamber pressure in the external covering rigid material at about 350 mmCA, along with pressurized and stretched airship internal components, defines an extremely strong structure capable of resisting winds of up to 280 km/h without suffering deformations that might compromise navigability, controllability and security of the aircraft. The structure also allows for safe use of hydrogen, the best (due to having the lowest density) and cheapest available gas for filling airships.

To ensure rigidity and mechanic resistance, the internal volume of the structure must be pressurized to a higher extent as compared to the external pressure. This provides for a bidirectional extension in the structural layer, which is kept stretched and inflated, so as to support external pressure demands, wind gusts, impact of birds and objects, and diverse mechanical demands, including high velocity conditions (up to 280 km/h), without suffering deformations. The pressure exerted from inside the airship tends to keep the airship completely rigid, like a pumped ball or tire.

In the central pipe, which is the spine of the airship, a fixed pressure is achieved with the introduction of a volume of light gases that can be two or three times greater than the inside volume of the tube itself. This creates internal pressures of 1 to 3 atmospheres (14 to 42 pounds/in), keeping it completely rigid due to the axial and radial forces pressing against the outer shell. This pressed gas, inside this tubular spine, also contains the tube as a unique structure.

The internal pressure of the aircraft, which separates the internal volume of the pressurized structure from the external environment or atmospheric air in which it is supported, can still vary in accordance with the altitude or operational flight ceiling (altitude) of the aircraft, speed or, meteorological conditions. Since this over-pressure determines the mechanical and structural resistance of the aircraft, rigorous control of pressure is obtained with the introduction of differential pressure switches. Differential pressure switches measure the differences between internal and external pressures and compare them to established minimum and maximum values for a determined altitude and atmospheric condition. This provides an automatic correction of these values by introducing or removing atmospheric air in the ballast bags or cuffs (7), or by varying the internal temperature of hydrogen balloons (6). Internal pressure of the aircraft can be kept under control, adjusting it to the most favorable condition with regard to its speed and operational flight ceiling. The pressure difference between the inside and outside of the aircraft is kept unchanged.

Despite the internal pressurization that keeps the aircraft super-rigid (holding its shape even under severe demands), and despite mechanical/electrical failures, aircraft shocks and other situations, the structural elements' own internal pressurization keeps the airship stable so that it maintains its original shape. Only additional rigidity needed for higher speeds is lost, forcing speed reduction, but maintaining safety and increasing the likelihood of continuing a flight.

Laminates with special technical fibers and high traction strength, such as carbon fibers and aramid (Kevlar and glass fibers), have unique characteristics with regard to traction strength. They can exceed the traction strength of metallic components by up to forty times. However, when impregnated with plastic resins, they become flammable, slightly resistant to ultraviolet rays, permeable to small molecular gases, and can be cut and scratched very easily. "Sandwiches" (extremely thin and light metal sheets that cover such fibers and are impregnated with epoxy adhesive, for example) protect laminates against ultraviolet ray degradation, cutting from sharps objects, and oxygen exposure. "Sandwiches" make laminates extremely light, waterproof and sturdy, and protects them against combustion. "Sandwiches" can be made with a single or multiple blades, and can also be made with thin metal sheets covered with protected fiber layers on both sides of a core. They can be made with lightweight materials with good resistance to compression, like balsa wood or phenol impregnated paper (honey comb) structures. These can increase the laminates' strength and tightness with minimal additional weight.

Aircraft or large-scale structures that move in a fluid medium (e.g., atmospheric air) keep air molecules adhered to the aircraft's surface, forming one layer. This physical characteristic has been studied and defined by Reynolds, who defined a number that applied to fluid mechanics that can determine the thickness of boundary layers. This characteristic of the gas was detected and observed in practice by maintenance mechanics and crew of the old rigid airships, like the "Graf Zeppelin" and "Hindenburg." Even with the aircraft moving at 140 km/h, the adhered air layers had an average thickness of about 1.20 to 1.70 m, which allowed mechanics and crew to walk on the outer airship jacket without having to worry about winds or large air velocities putting their walks at risk. This layer, according to calculations of the time, represented almost the entire weight of airship, increasing the airship's inertia, and therefore decreasing its performance and reducing maneuverability.

The invention provides a special device attached to the "trailing edge" or tail of the airship, which has been termed an inducer (10). In conjunction with the structural layer (4) being completely smooth and covered with special (commercially available) antifriction crystallizing agents, the device significantly reduces the friction coefficient and, thus, the air layer build-up process.

These constructive and functional characteristics of the airship, according to the invention, solve most of the deficiencies indicated above but also have another great advantage. These characteristics allow for vertical construction of the airship executed in centralized modules, with concentric rings as segments, starting with the front dome and ending at the airship's maximum diameter. The lift of this first half becomes easy by using Helium in its internal components to lift them. The second half of the airship is also built on the summit trail (bottom) up to the maximum diameter. The second half's lifts are also facilitated with the help of light gases in its internal components. The two halves are then assembled in the air, simplifying and making the production costs extremely competitive and allowing for construction of a giant aircraft, with no size limitation.

One beneficial example of using a super-rigid and continuous self-sustaining aircraft version is the ability to collect tons of crops from difficult-to-access areas and loading them directly into ships, without the additional costs of other kinds of transportation and logistics that make economic production and marketing difficult. Therefore, the invention allows for super-heavy cargo transport without complicated logistical operations, and the risky and high costs. This allows for the loading of whole pieces of transported goods, without the need for disassembly or fragmentation. The transported goods are downloaded directly at their final destination.

The invention also allows for easier and more rational ecological exploitation of natural resources, such as trees and minerals.

For passenger transport, the invention offers a wider variety of configurations with large areas and a lot of place, providing comfort for a large number of passengers on their journeys, and allowing for loading, unloading and an exchange of load compositions according to need. All of this is done without requiring the movement of people for transshipments, connections with other aircraft, or other kinds of transportation.

DRAWINGS

FIG. 1 shows a perspective view of the internal structure of the airship;

FIG. 2 shows a perspective view of the internal structure of the airship with the cuff inflated with atmospheric air;

FIG. 3 shows a perspective view of the internal structure of the airship with balloons or bags inflated with hydrogen;

FIG. 4 shows a perspective view of the internal structure of the airship closed with the rigid hood lining;

FIG. 5 shows a perspective view of completed airship from the bottom;

FIG. 6 shows a perspective view of completed airship from the top;

FIG. 7 shows a perspective view of an airship hovering over an airport;

FIG. 8 shows a side view of a part of the airship docking to the tower;

FIG. 9 shows a perspective view of an airship shaped as a saucer;

FIG. 10 shows a side view of a part of an airship during the construction process;

FIG. 11 shows another front perspective view of an airship.

BRIEF DESCRIPTION OF THE DRAWINGS

The backbone of the airship shown in FIG. 1-9 comprises a central tube 1 defining the structural dimensions and length of the airship, having a diameter of between 5 to 10% of the diameter of the airship, and a plurality of structural rings 2 anchored concentrically to the tube 1 by rods or core tubes 3. The tube 1 and the rings 2 are made of aluminum, duralumin, fiber reinforced composites or their combination. The tube 1 is filled with hydrogen under a pressure of about 0.5 to 2.0 kg/cm2 and the rings 2 are filled with hydrogen under a pressure of 2.0 to 3.0 kg/cm2. This internal pressure prestresses these elements and ensures their rigidity.

The internal pressure maintains the tensile strength of fibres that let the cross pipe burst because they are much more resistant to traction than metal blades. The longitudinal fibres have a reduced demand because part of the force is balanced between the reaction force of the turbine's buoyancy which is placed in the tail of the aircraft, and the force exerted by the top front which breaks layers of air travel in the aircraft.

Figure 1:
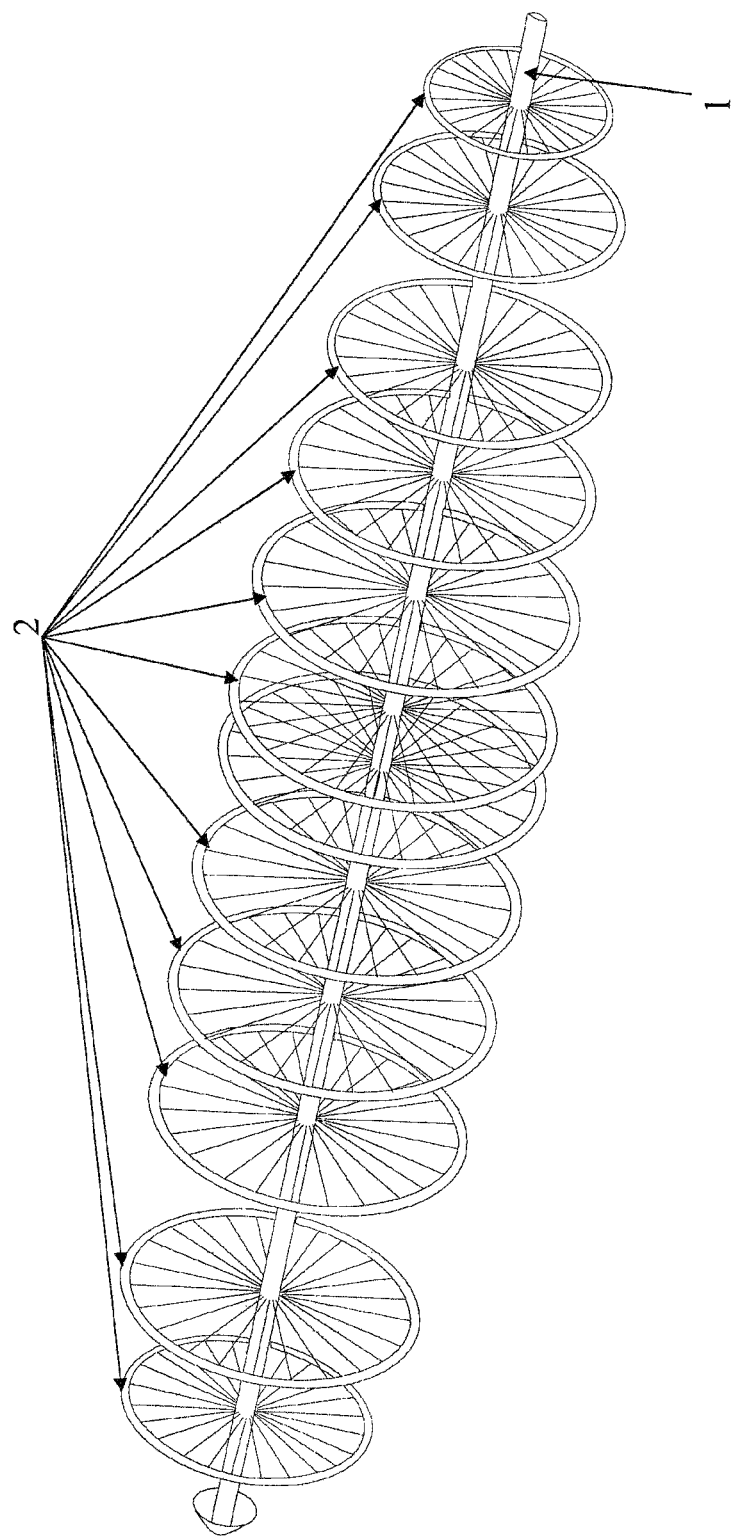
Figure 2:
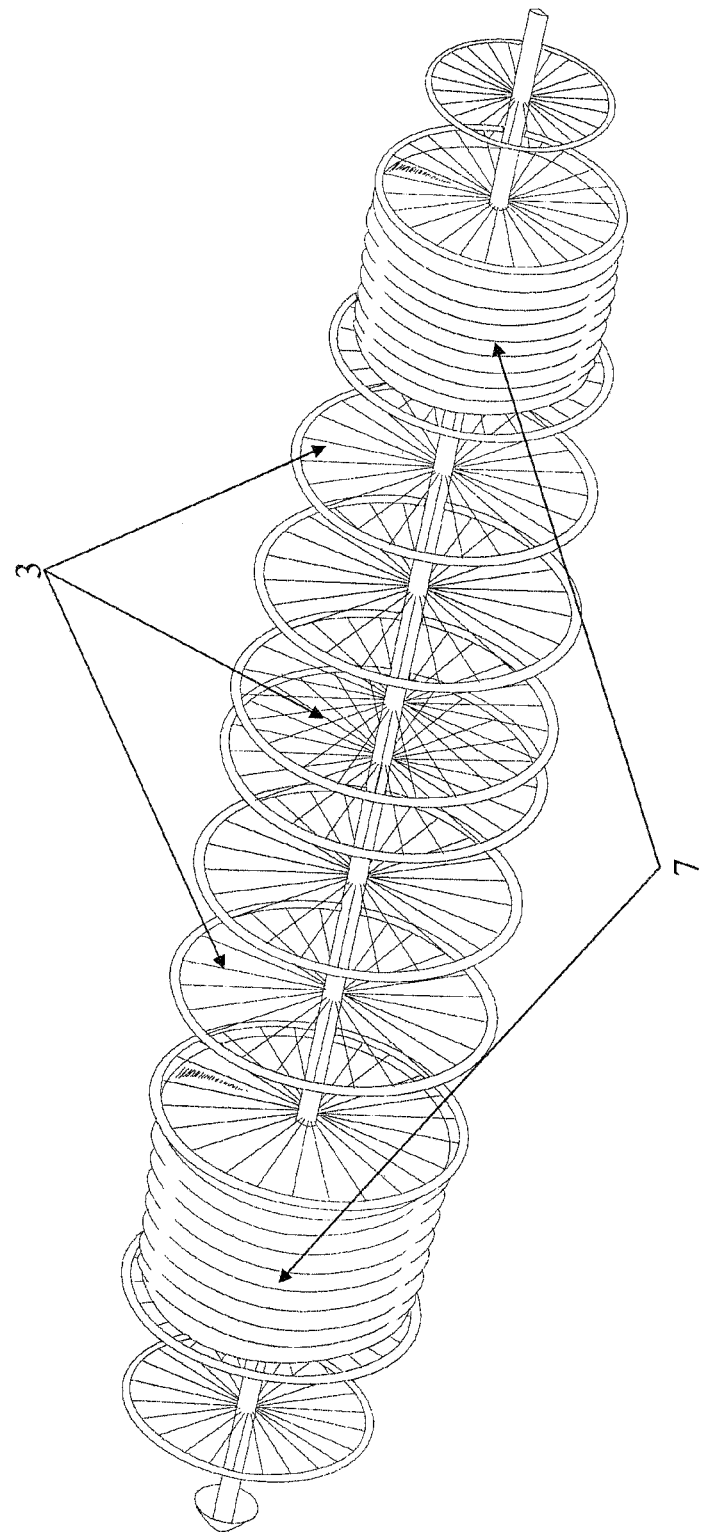
Figure 3:
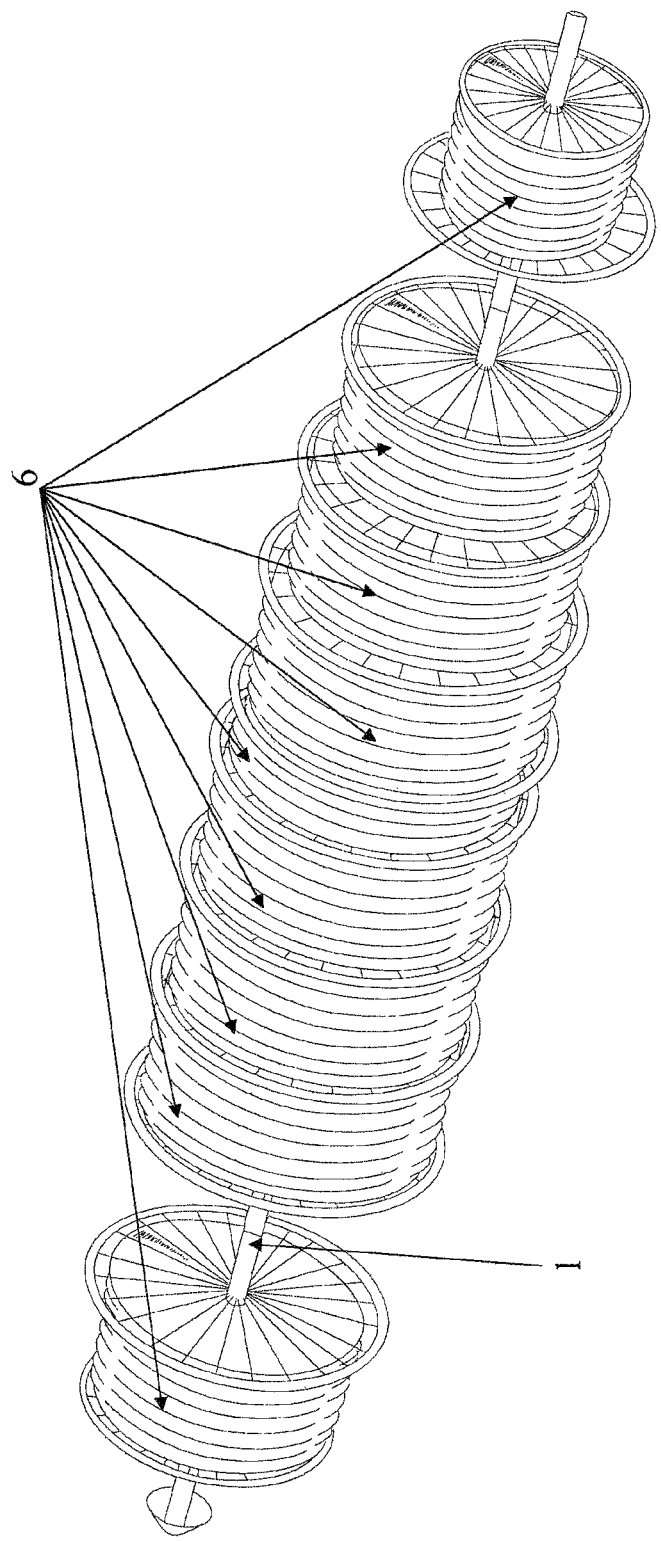
Figure 4:
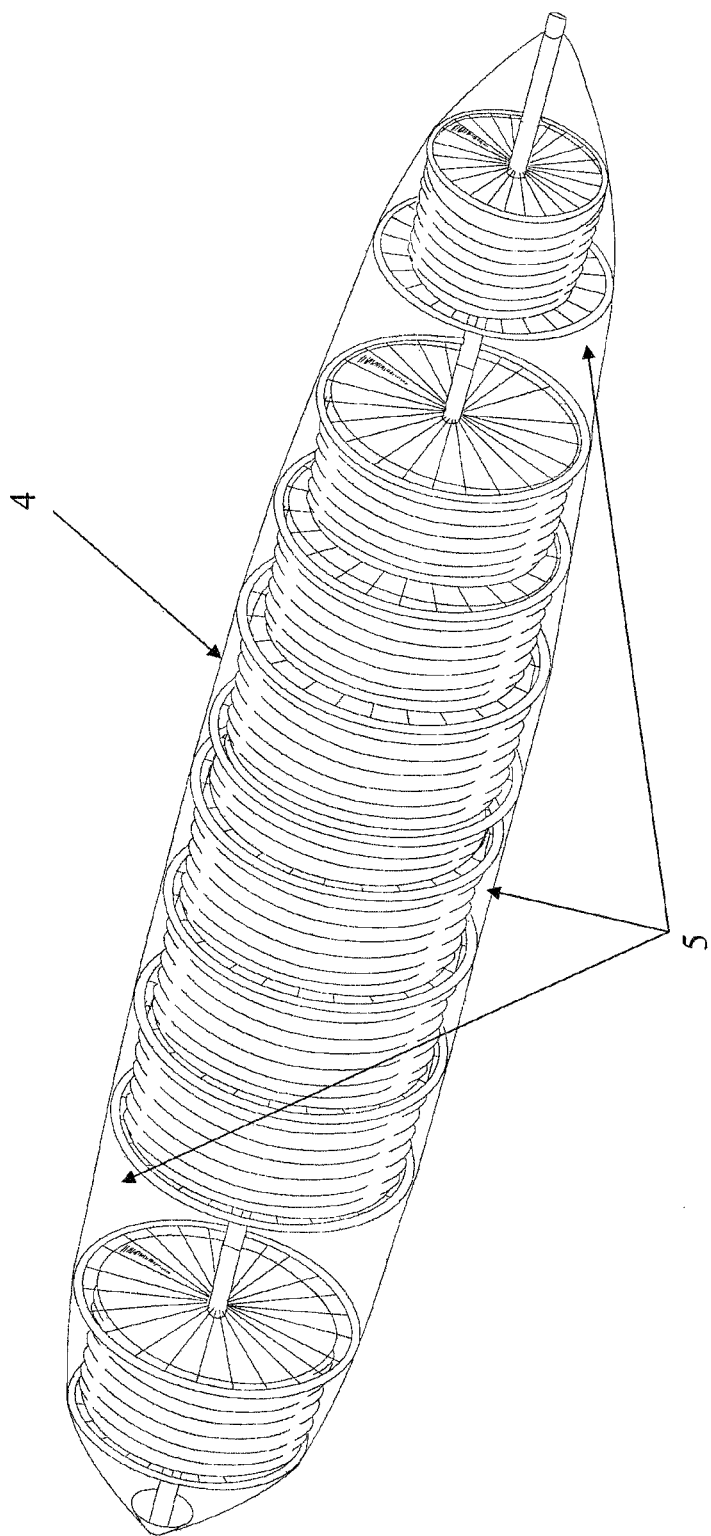
Figure 5:
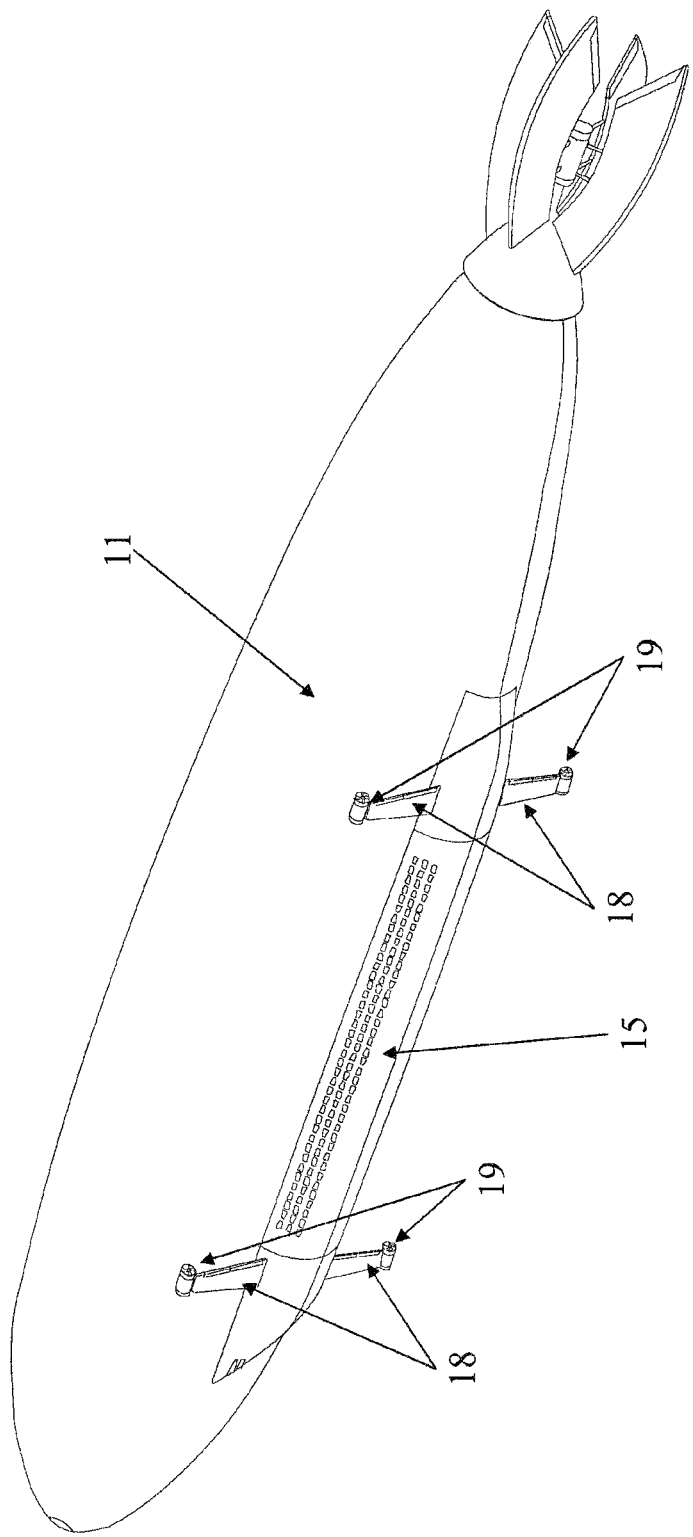
Figure 6:
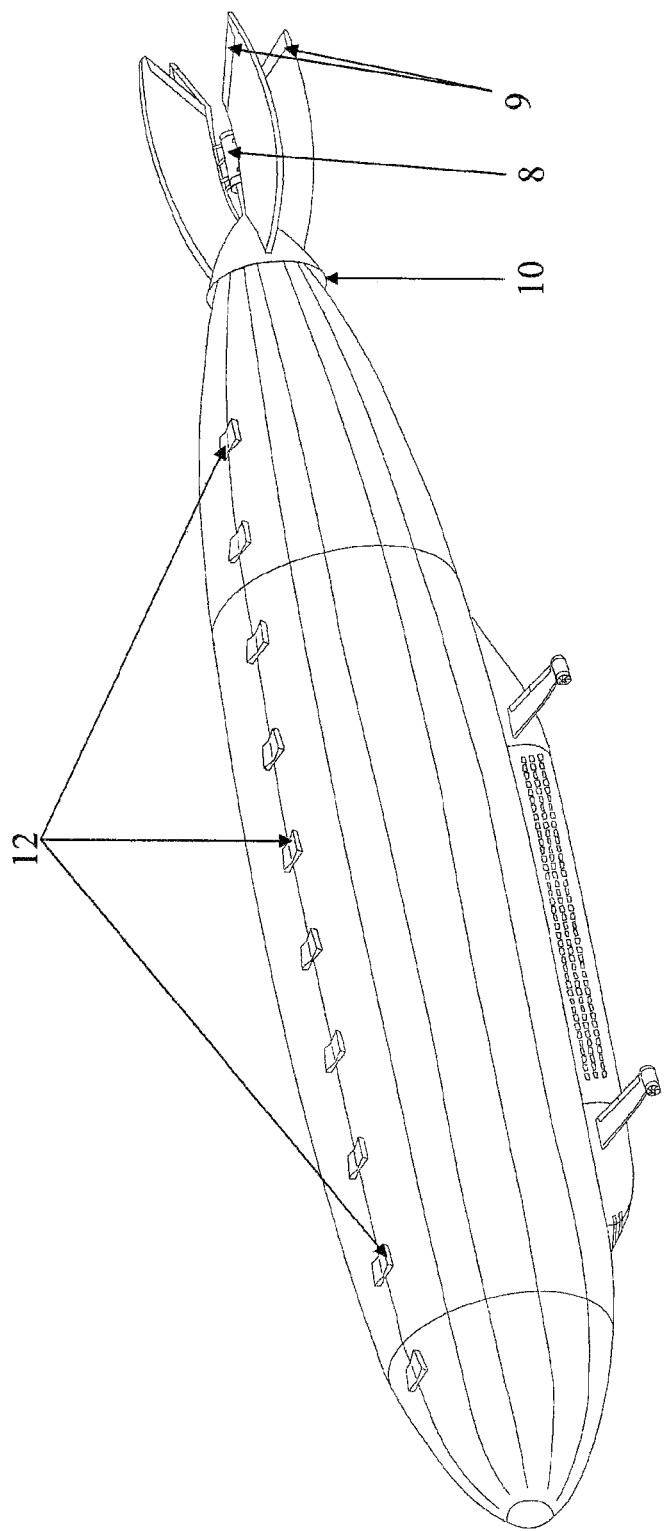

The airship is covered by an external cover 4 made of hard metallic material, alloy or composition of metallic materials (aluminium/duralumin), forming a sandwich of rolled metal sheets reinforced with fibres (composite). The cover 4 is entirely waterproof and defines the cigar-like shape of the airship. Furthermore, the cover is internally filled in spaces 5 with helium or a mixture of helium with Halon under a pressure of about 100 to 1.400 mmcA (millimeters of water). This internal filling of the cover also improves the rigidity of the airship and absorbs rays and electrical discharges, thereby inhibiting electric or magnetic fields that might cause discharges inside the cover.

The tube 1 transfers the forces received by the thrust of the engines to the dome and partially to the front rings 2 supporting the outer cover 4. Furthermore, the airship comprises bubbles or pockets disposed in the internal sections of the airship and interspersed between structural rings 2. The pockets are made of flexible material and are inflated by hydrogen. Furthermore, the pockets have outer walls spaced apart from each other forming nets or screens for connecting cooling and heating means that regulate the internal density of the hydrogen inside the pockets. The quantity and dimensions of these pockets depend on the size of the aircraft. Since the pockets are surrounded by helium, they are better for safety and protection with regard to the use of hydrogen. The temperature variation of hydrogen in the chambers of these pockets are controlled by heat exchangers with baffles and heating sets at the bottom and cooling sets at the top. These heating and cooling sets are corrugated and comprise finned tubes and fans that transfer large amounts of hydrogen having its temperature altered by the transposition of a fluid in the heat exchangers at the hot bottom (expanding hydrogen) and at the cold top (contracting it).

The airship also comprises balloons or bags 6 filed with hydrogen disposed in structural sections defined by neighboring rings 2, wherein two structural sections near each end of the central tube 1 contain cuffs 7 filled with air (which is about ten times heavier than hydrogen).

The quantity and size of balloons 6 and cuffs 7 depends on the size of the airship having a construction that facilitates the modularity of mounting particular modules. The cuffs 7, the position of which is preferably equally distanced from the airship's center of gravity, are interconnected by a duct fitted with fans, allowing for a transfer of air from the bow to stern cuff 7 of the airship, and vice versa.

The cuffs 7 serve as an operational ballast, ensuring a balance of weight and volume, and thus, a stable hover flight. This allows the aircraft to stay completely still and level, regardless of the external pressure of the aircraft (which varies with altitude). The cuffs 7 also ensure the stabilization of the airship's center of gravity, even if there are differences in temperature among the various hydrogen balloons 6 over its fuselage.

The hydrogen balloons 6 may be heated or cooled, where temperature increase leads to an expansion of gases at the same pressure, or increased pressure at the same volume is held constant.

The airship also comprises at least one device (not shown) for measuring and controlling the internal pressure of the airship's body. Such a device is readily available in the market.

If the hydrogen balloons 6 are cooled, contracting the hydrogen they contain and decreasing its pressure, air can be compressed into the cuffs leading to an even greater gain of the airship's weight (more air, more weight). On the other hand, after the expulsion of air (ballast) from the cuff 7 and/or with the heating and consequent expansion of hydrogen in the balloons 6, the aircraft becomes lighter.

A turbine 8, or "Ducted Fan," thrust high, is fixed on the back of the central structure within, or below, the central portion of the ejector. This ensures a transfer of mechanical load across the airship. Inducers 10, or thrusters in the form of two cones, are attached to each other by their thin ends through a tube in the form of a throat near the ducted turbine 8. The turbine boosts the airship and transmits mechanical load to the core. They also induce, through said throat, a large mass of air that picks up significant speed when entering through the cones. Inducing a high speed of airflow over the cover 4, provided with horizontal and vertical rudders, reduces the boundary layer and improves the airship's performance by creating a jet with a large amount of air at the end. This flow of air improves the efficiency of the rudder flaps establishing additional maneuverability of the airship even when it has not yet acquired its speed.

Coating 11, such as anti-friction Teflon$_{silicates}$, crystallizing agents and water, and/or dust repellent, is applied to the outer cover. The coating 11 also smoothens the ribs, seams and other elements that might affect the aerodynamics of the airship, improving its performance, speed and autonomy.

A system of air curtains or air blowers 12 is disposed at the top centerline of the airship. It comprises air jets (slides) sweeping air from the upper surface of the centerline to the right and left at a speed of about 20 m/s, thus quickly eliminating water drops and preventing heavy rains from increasing the weight of the airship that might cause support problems. The system also reduces pressure in the curved section of the aircraft deploying the thrust, which can be used in lifting operations.

Figure 7:
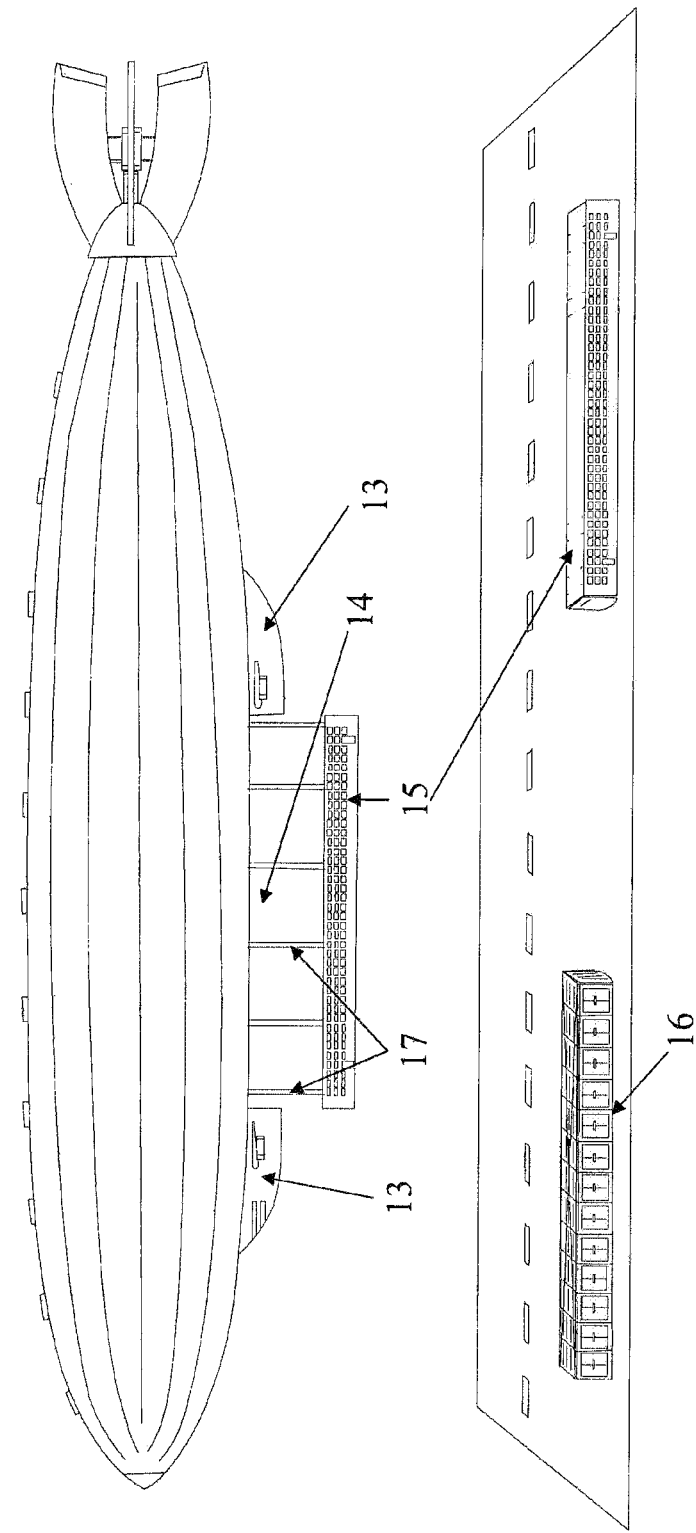

Sections 13 fixed below the cover at the front and back end of the airship provide operational command and control movement of the airship, such as tanks, reservoirs, machinery and other components as needed. As shown in FIG. 7, a central space 14 allows for the loading of containers 16 and/or passenger cabins 15 in the form of a unit that can be hoisted by cables 17 quickly and efficiently, even when the aircraft is located a few hundred feet from the ground.

Sections 13 and other elements for hoisting loading containers 16 and/or passenger cabins 15 are constructed of fairings and elongated profiles L, U, H or similar, which are riveted, screwed, glued or otherwise fixed to the airship's construction being attached to the cover and pre-stressed to several structural rings 2 and/or core tubes 3.

Considering that the fuselage is internally pressurized, which keeps the cover pulled in a transverse direction, the weight of trains or cables that carry cargo and/or passengers extends the cover even more homogeneously. Aircraft type wings 18 are fixed to the sections 13 and comprise engine-driven thrust propellers or turbo-propellers 19 at its ends, which can rotate and/or pivot for easier maneuvering in order to maintain aircraft position, even under turbulence and wind gusts. The wings 18 can also raise or lower the aircraft without the need to vary its weight, which is ideal for faster maneuvers, or to correct thermal effects. After reaching the airship's cruising speed, propellers 19 may also be used to control the lift and vertical direction of the airship.

Wings added to a lighter than air (LTA) aircraft combines all the qualities of floating without an airship's driving force, with the characteristic of stable flight, the maneuverability of a heavier-than-air (HTA) aircraft, and the handling characteristics of a helicopter (e.g., hover flight); thus producing the most versatile means of transport designed today.

The airship further comprises a number of GPS units having sensors arranged at the bow and at the stern of the airship. They are coupled to a central computer system located preferably in at least one of the fixed sections 13, which allows the computer system to analyze and correct any relative movement of the aircraft, including turns, detours and other situation or route changes, and provides position adjustment and autopilot functionality.

Figure 8:
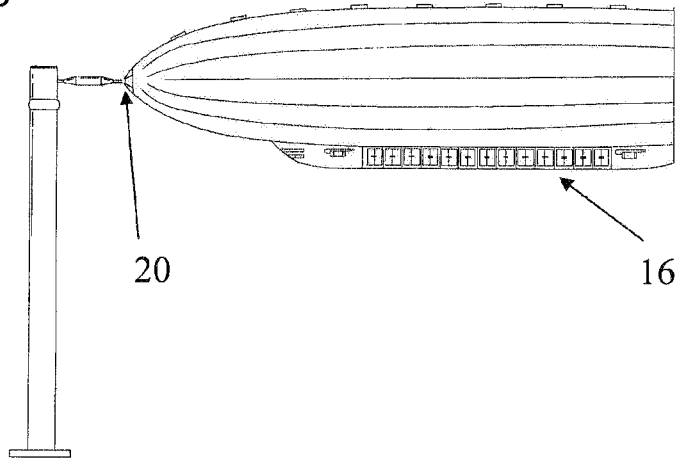

As shown in FIG. 8, the airship further comprises a magnetic anchoring system 20 disposed at its concave front end 20 and fixed to the central tube 1 for parking and/or docking the airship. FIG. 10 illustrates an exemplary method of producing the hybrid airship depicted in FIGS. 1-9. As shown, the construction of the front end or bow of the airship starts form the assembling sections of the central tube 1 and first structural rings 2 at the front end. Then, subsequent balloons 6, cuffs 7 and additional structural rings 2 are modularly assembled vertically along the length of the airship and covered with parts of the cover 4, so as to complete the front half of the airship. Likewise, the construction of the back end or stern of the airship is first, so as to complete its back half. After filling the front and back halves of the airship with light gases, further assembly can proceed horizontally with no need for any support, scaffolding, lifts, etc. This is because the front and back portions of the airship can simply float in the construction place.

Figure 9:
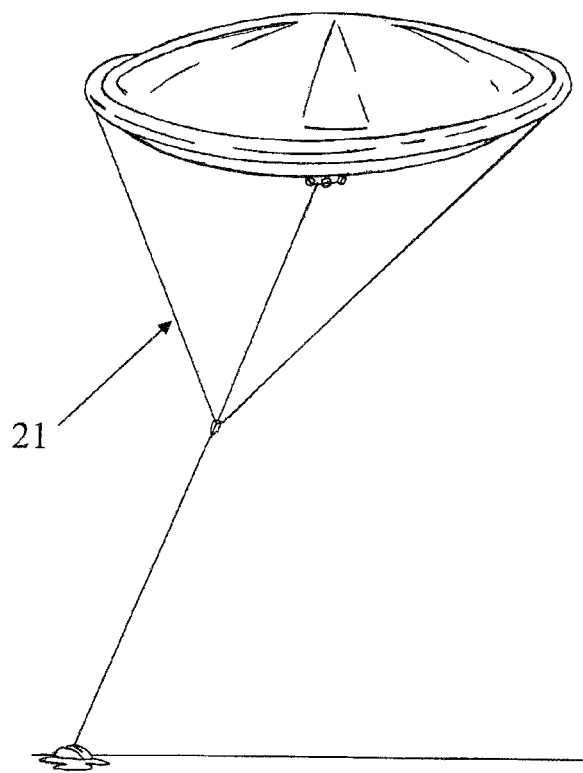
Figure 10:
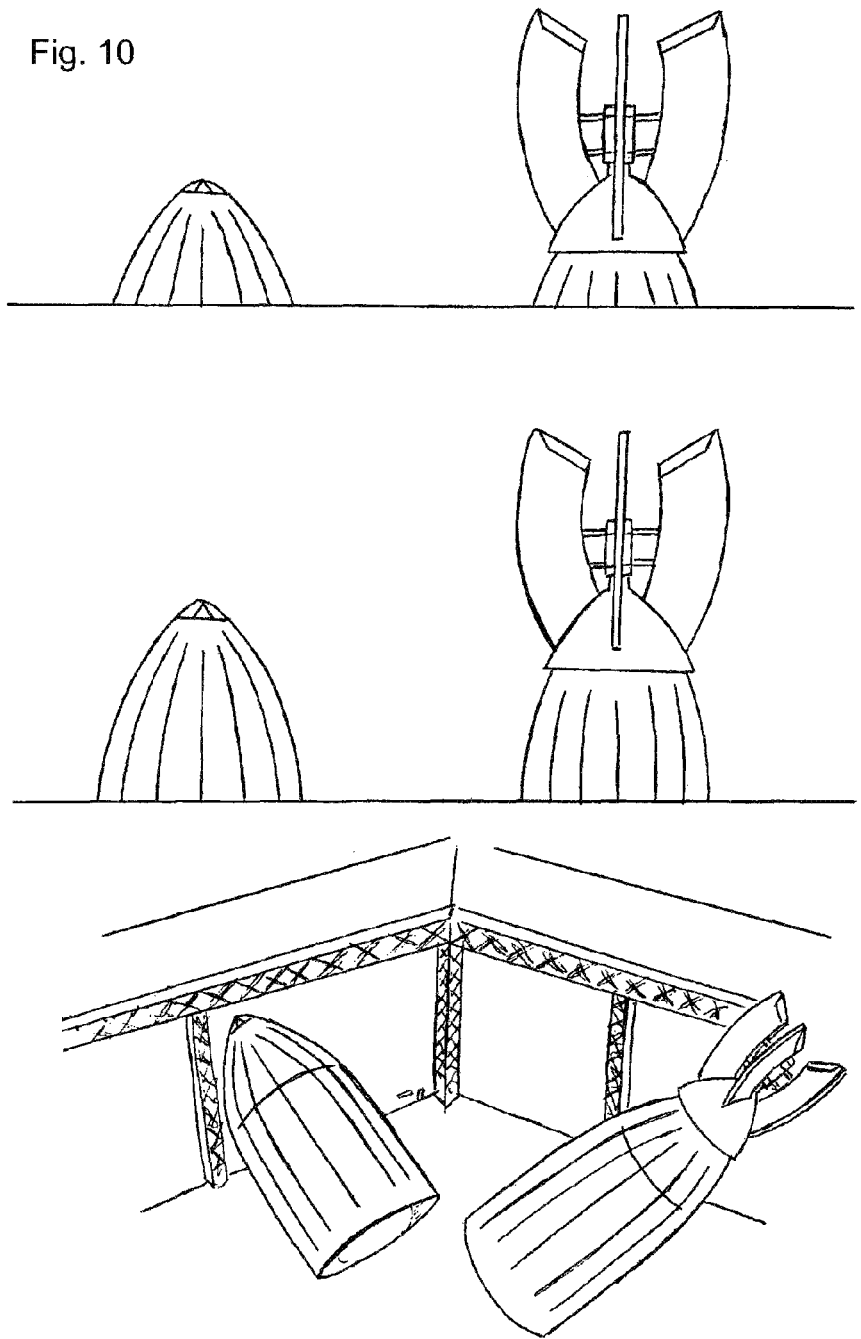
Figure 11:
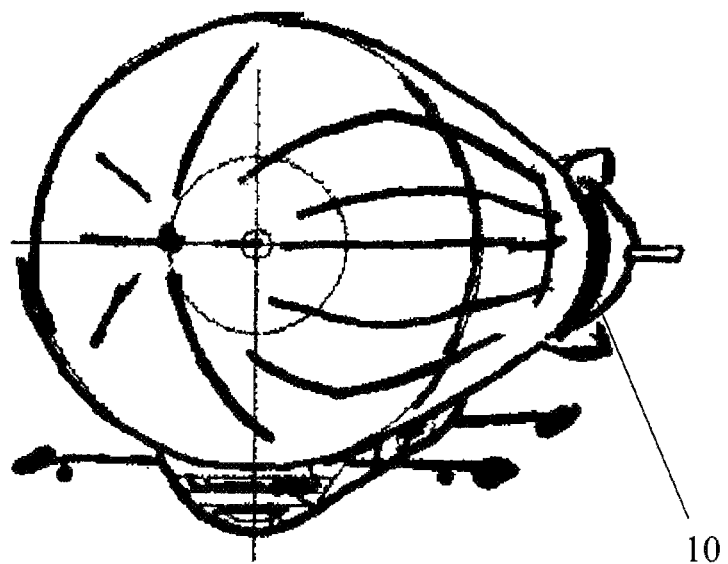

FIG. 9 shows another embodiment of the airship of the present invention in the form of a pressurized large torus, similar to a "flying saucer", comprising lockable tops and bottoms. The airship also contains cuffs made of flexible material that increase or decrease the weight of the airship, maintaining its constant buoyancy regardless of altitude or outside air pressure. The airship is attached to the ground with rods 21 that keep its required stationary position. An airship of this kind is ideal for observation posts, filming and general control. Other embodiments of the airships of the present invention include sails similar to those of a sailing boat, in order to utilize the force of wind. Such a natural drive may be a tremendous environmental contribution, eliminating the need for engine airships driven by conventional fuel for carrying high loads, and thus globally reducing $CO_2$ emission.

The above embodiments of the present invention are merely exemplary. Figures are not necessarily to scale, and some features may be exaggerated or minimized. These and other factors, however, should not be considered as limiting the spirit of the invention, the intended scope of protection of which is indicated in the appended claims.

What is claimed:

1. A super-rigid hybrid airship, wherein said airship has a modular structure and comprises a central tube having a diameter of between 5% to 10% of the diameter of the airship, structural rings surrounding and concentric with the central tube and connected to the tube by bolts, an external cover made from thin metal sheets, interspersed with composite resins and fibers which is pressurized and pre-stressed by light gases and which is rigid, conductive, non-combustible and impermeable to gases, balloons filled with hydrogen and disposed in structural sections defined by neighboring structural rings, at least two interconnected cuffs inflated by atmospheric air serving as operational ballast and ensuring weight, pressure and volume balance of the airship, and heat exchangers comprising baffles for transposition of thermal fluid heated or cooled in order to control the temperature of the hydrogen contained in the balloons.

2. The hybrid airship according to claim 1, wherein the external cover is made from thin rolled metal sheets, including aluminum, comprising fibers disposed longitudinally and transversely with respect to the plane of the sheets and attached to them by epoxy adhesive, forming a sandwich structure, wherein the external cover has at least two layers, optionally including layers made from materials chosen from the list of balsa wood, paper phenol and extruded polystyrene.

3. The hybrid airship according to claim 1, further comprising ducted fans fixed on the back of its structure, along a dome-shaped end of the external cover comprising cones attached together by a slender tube at its ends where the ducted fan is installed.

4. The hybrid airship according to claim 3, further comprising inducers associated with the ducted fan, arranged substantially in the axis of a top coat of the hybrid airship.

5. The hybrid airship according to claim 1, further comprising an anti-friction coating chosen from the list of silicates, crystallizing agents, water repellents, and dust repellents, on the external cover of the aircraft.

6. The hybrid airship according to claim 1, further comprising a blower system for dispersing air, arranged substantially on a center line of a top layer so that air is blasted from the center line to the right and left of the airship.

7. The hybrid airship according to claim 1, wherein said airship further comprises sections fixed below the external cover at the front and/or back end and a central space for loading containers and/or passenger cabins.

8. The hybrid airship according to claim 1, further comprising wings arranged at each side of the fixed sections and optionally comprising at ends of the wings thrust means, including thrust means chosen from the list of engines, propellers and turbo-propellers.

9. The hybrid airship according to claim 1, further comprising GPS units having sensors arranged at the bow and at the stern for position adjustment and autopilot functionality.

10. The hybrid airship according to claim 1, further comprising an anchoring system, the anchoring system provided with magnetic snap opening and fixed to the central tube for docking of the airship.

11. A method of producing a hybrid airship having a modular structure and comprises a central tube having a diameter of between 5% to 10% of the diameter of the airship, structural rings surrounding and concentric with the central tube and connected to the tube by bolts, an external cover made from thin metal sheets, interspersed with composite resins and fibers which is pressurized and pre-stressed by light gases and which is rigid, conductive, non-combustible and impermeable to gases, balloons filled with hydrogen and disposed in structural sections defined by neighboring structural rings, at least two interconnected cuffs inflated by atmospheric air serving as operational ballast and ensuring weight, pressure and volume balance of the airship, and heat exchangers comprising baffles for transposition of thermal fluid heated or cooled in order to control the temperature of the hydrogen contained in the balloons comprising:

assembling modularly consecutive airship modules defined by sections of the central tube and the structural rings substantially vertically along the length of the airship to form the front end part and the back end part of the airship, filling the front end part and the back end part of the airship with light gases to make them float, and connecting the front end part and the back end part of the airship together.

\* \* \* \* \*